350-378 SR

OR 3,418,036

SEARCH ROOM

MAGNETO-OPTICAL ROTATION DEVICE WITH EUROPIUM CHALCOGENIDE MAGNETO-OPTICAL ELEMENTS

Filed Nov. 16, 1964

INVENTORS
FREDERIC HOLTZBERG
SIEGFRIED I. METHFESSEL
JAMES C. SUITS
BY
ATTORNEY

United States Patent Office 3,418,036
Patented Dec. 24, 1968

3,418,036
MAGNETO-OPTICAL ROTATION DEVICE WITH EUROPIUM CHALCOGENIDE MAGNETO-OPTICAL ELEMENTS

Frederic Holtzberg, Pound Ridge, Siegfried I. Methfessel, Montrose, and James C. Suits, Mount Kisco, N.Y., assignors to International Business Machines Corporation, New York, N.Y., a corporation of New York Filed Nov. 16, 1964, Ser. No. 411,525
14 Claims. (Cl. 350—151)

ABSTRACT OF THE DISCLOSURE

A light modulating system utilizing europium chalcogenides in pure form or in solid solutions with other rare earth chalcogenides as the magneto-optically active element is described. These materials, because of cubic symmetry, are optically isotropic to render them useful in either single crystalline or polycrystalline form. They have increased V constants over materials commonly known in the art.

The present invention relates to a system for controlling the transmission of a light beam by means of magneto-optical rotation and more particularly, to specific materials for achieving such rotation.

Modern technological developments in the communications and related industries require the rapid handling of information in electrical signal form which is to be or which has been transmitted from one location to another or which has been subjected to processing by logical computing apparatus. In such apparatus it is presently quite common to process a large body of information in an extremely short period of time. In such apparatus a controlling factor is often one of communication between points wherein both the time and complexity of transmitting information from point to point becomes extremely critical. Similarly, in communicating between computers it is normally desired to transmit vast quantities of information within a relatively short period of time.

The light beam or light wave has long been thought to be the ultimate as a communications carrier both in terms of simplicity of source and also for speed. However, the device limitations primarily in the areas of modulation, demodulation, switching, etc., have greatly limited the utilization of light for any of the above mentioned communication purposes other than as a novelty.

The problem of producing a satisfactory light generator or carrier generator has largely been solved with the advent of the laser which is capable of producing very high intensity coherent light beams. However, to date the methods of modulating lasers or any other light beam have been considered inadequate. Such modulation schemes may vary anywhere from a simple light switch by which it is intended that the light be completely shut off or various types of modulation schemes wherein the intensity of the light may be varied proportionally to some input variable. In the case of the former devices, such mechanical contrivances as shutters, iris diaphragms and the like are obviously far too slow to be utilized in any sort of communications system either within a without a computer. Modulation devices in the prior art have been largely limited to movable, variable density wedges or filters which allow varying quantities of light to pass therethrough depending upon some sort of positional displacement or opto-electronic devices as the Kerr cell. In the Kerr cell, a light source, a first polarizer, a light rotating element, a second polarizer or analyzer, and a detection system are utilized. Light is passed through the first polarizer incident on the optical rotating element and when an electric fields is applied to this element, the plane of polarization of the incident light is caused to rotate an amount which depends upon the material, the voltage, and a number of other factors. The second polarizer or analyzer which may be disposed either parallel or at right angles to the first polarizer will allow an amount of light to pass therethrough which is for small rotations nearly proportional to the amount of rotation of said incident beam by the optical rotating element. In this type of device the rotational effect is produced by the electric field.

A second type of light modulating system is that utilizing the Faraday or magneto-optical rotation effect. It is similar in principle to the Kerr effect apparatus outlined above with the exception that instead of an electric field, a magnetic field is applied to the magneto-optical rotating medium in a direction such that a component of said magnetic field in parallel to the transmission of light through said medium. However, in the past, materials exhibiting the Faraday or magneto-optical rotation effect have exhibited this effect in a quantitative sense to a very limited degree. In other words, sufficient rotation of the polarization plane of an incident light beam was only achieved by use of a very thick plate of the magneto-optical material in order to make a device capable of achieving a significant degree or percentage of modulation of an incident light beam. Theoretically such prior art devices were satisfactory for many purposes since their speeds of operation or modulation frequency far exceeded any possible with mechanical devices. However, for some practical applications materials exhibiting sufficiently large rotational effects have not heretofore been available.

It has now been found that a greatly enhanced magneto-optical light modulation device may be produced by utilizing compounds from the class of materials including europium sulfide (EuS), europium selenide (EuSe), europium oxide (EuO), and europium telluride (EuTe), as the optically active element therein. Materials of this class have been found to exhibit far larger V constants (angular rotation/unit of length and unit of magnetic field) than was available with prior art materials utilized in this type of device.

It is accordingly a primary object of the present invention to provide an improved magneto-optical light rotation device.

It is a further object to provide such a device for modulating incident light.

It is a further object of the invention to provide such an improved class of materials as the optically active element therein.

It is yet another object to provide such materials which are optically isotropic and may be used in either monocrystalline or polycrystalline form.

The foregoing and other objects, features and advantages of the invention will be apparent from the following more particular description of preferred embodiments of the invention, as illustrated in the accompanying drawings.

Figure 1:
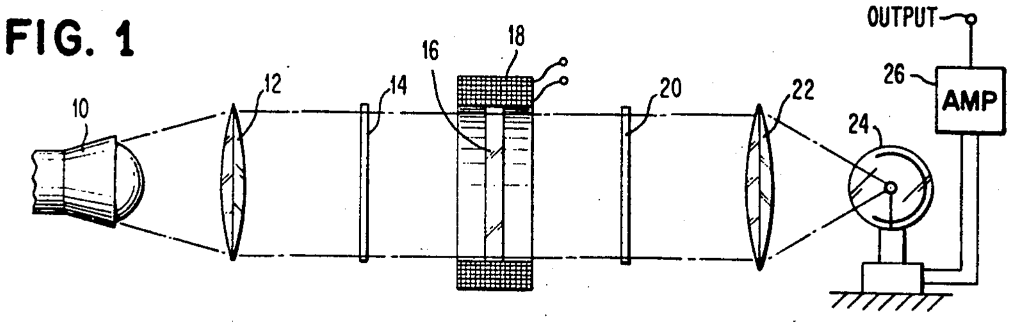
FIGURE 1 is a schematic representation of a simplified magneto-optical light modulation device constructed in accordance with the principles of the present invention.

The objects of the present invention are accomplished in general by a magneto-optical light modulating system comprising a source of polarized light substantially parallel, a magneto-optically active material adapted to transmit said light, means for applying a magnetic field to said magneto-optically active material with a component in a direction substantially parallel to the direction of the transmission of said light therethrough and means to detect the degrees of rotation of said incident polarized light on said magneto-optically active material. The magneto-optically active material consist essentially of a compound chosen from the group consisting of 1:1 europium oxide (EuO), europium sulfide (EuS), europium selenide (EuSe), and europium telluride (EuTe).

More specifically, the invention, in its broadest aspect, comprises the use of the above materials as the magneto-optical rotating elements in Faraday effect apparatus.

As stated previously, the Faraday effect or magneto-optical rotation is that characteristic of certain substances whereby they rotate the plane of polarized light passed through them in the present of a magnetic field with at least some component parallel to the light beam. In such materials, the sense of rotation is reversed by reversing the direction of the magnetic field, however, the sense of rotation is not effected by reversing the direction of the light through the material. Further, certain substances will cause a rotation in one sense with a given magnetic field while others will cause rotation in the opposite sense. In any event, for paramagnetic substances the rotation per unit thickness for a given wavelength is proportional to the field strength for small variations of such field strength wherein the Verdet constant is given in minutes (of rotation) per centimeter (of thickness of the material) per oersted of field strength applied to the material.

Some typical Verdet constants with sodium light are $6.1 \times 10^{-2}$ min./oe. cm. for flint glass, $1.3 \times 10^{-2}$ min./oe. cm. for water and $0.7 \times 10^{-5}$ min./oe. cm. for air.

Contrasted with these relatively small numbers is a recently discovered Verdet constant for europium silicate ($Eu_2SiO_4$) of 2.7 min./oe. cm. for green light at room temperature. This figure represents one of the larger Verdet constants discovered up until the time of the present invention.

The europium chalcogenides europium oxide (EuO), europium sulfide (EuS), and europium selenide (EuSe), have been found to exhibit Verdet constants well in excess of those for other known materials. These europium chalcogenides may either be in pure form or in solid solution with other rare earth chalcogenides and used as the active material for use in such magneto-optical effect devices. As will be seen by referring to the curve of FIGURE 3, which will be explained more fully subsequently, the Verdet constants for europium selenide (EuSe) range upwards of plus 20 and down below minus 10. In the above figure, the polarity symbols merely denote a difference in sense of rotation at some particular wavelength.

A particular advantage of these europium chalcogenide material is the cubic symmetry they posses which makes them optically isotropic and thereby useful in either single crystal or polycrystalline form. The significance of this advantage is that they do not have to be grown as a single crystal and then carefully machined prior to use which is obviously a very expensive and difficult operation, but may be laid down as either thick or thin layers by conventional deposition techniques and still operate very satisfactorily.

A further significant advantage of the present device to layer deposition techniques of fabrication is that they may be made in small or miniaturized form and utilized in optical logic circuits, which structures would be both expensive and difficult to achieve with monocrystalline structures.

A further advantage of the optical isotropy is that the orientation of the optically active material is not critical as with a number of other materials exhibiting significant Verdet constants which are either optically uniaxial or biaxial. In the latter case, the axis of the crystal must be very carefully aligned with the access of the impinging polarized light beam in order for any rotational effect to be achieved. As will be appreciated, this latter factor necessitates the use both of monocrystalline elements and also requires very precise alignment of the element within the device.

As stated previously, all of the europium chalcogenides exhibit greatly improved magneto-optical activity and this activity is still present when the europium chalcogenides form solid solutions with other rare earth chalcogenides such as gadolinium, cerium, yttrium, lanthanum, terbium, thulium, dysprosium, etc., which compounds tend to raise the ferromagnetic Curie temperature of the material and by this, the magnetic susceptibility and thus the Verdet constant. A method for preparing the above solid solutions is described in Patent No. 3,337,041, to Frederic Holtzberg, Thomas R. McGuire, and Siegfried J. Methfessel. The method described in the above patent is incorporated herein by reference. Amounts up to about 20% of the other rare earth chalcogenides may be included with the europium chalcogenides without deleteriously effecting the magneto-optical acitivity of the resultant device.

It will be noted from the above discussion that while the disclosed class of chalcogenides shown enhanced Verdet constants at room temperature in their paramagnetic state, they show even greater Verdet constants when in their ferromagnetic state, i.e., below their Curie temperature. The purpose of adding the other rare earth chalcogenides to the indicated europium chalcogenides is to raise the effective Curie temperature of the resultant device and thus make a practical device realizable. For example, the Curie temperature of EuO may be raised from 70° K. to about 125° K. by modification with cerium sulfide.

A specific example of a device constructed in accordance with the principles of the present invention was a solid solution of europium selenide (EuSe)+1% gadolinium selenide (GdSe). Tests on this device were made at room temperature with red light of about 6700 angstroms wavelength. The measured Verdet constant for this material was found to be 4.7 min./oe. cm. It will be noted from the previous discussion that this is approximately twice the Verdet constant for europium silicate with green light and is believed to be four to five times the Verdet constant for europium silicate if such measurement was taken for red light. This high Verdet constant for visible red light with the above element is especially valuable for laser modulation wherein red light, i.e., the ruby laser, is one of the prime spectral emissions.

The utility for such materials having high Faraday rotation or magneto-optical activity is obvious for many optical applications such as the above mentioned modulation of laser beams, for optical read out of memories, optical displays, and optical logic networks, etc. Basically, however, the configuration of the device utilizing such Faraday rotation is the same in that an incident polarized light source is required together with some means to analyze the amount of rotation which has occurred subsequent to passing through the magneto-optically active material. A very simplified schematic illustration of such a system is set forth in FIGURE 1.

Referring to FIGURE 1, a light source 10, which could be any convenient source including a laser, projects a monochromatic light beam on the lens 12 (such a lens would not be necessary with a laser). The lens 12 is merely to re-shape the beam into an essentially parallel light beam which then passes through the polarizer 14 and emanates as a beam of plane polarized light. The magneto-optical device 16 composed of an europium chalcogenide material either unsupported or on a suitable substrate is interposed in the light beam. The magnetic coil 18 is illustrated as disposed about the device 16 and serves the purpose of applying a high density magnetic field to the magneto-optical device 16. A second polarizing plate 20 often called an analyzer is disposed in the output path from the magneto-optically active device 16. A second lens 22 and a detector 24, such as a photocell having an amplifier 26 connected to its output, completes the basic system. The lens 22 may be used to converge the parallel light beam onto the detector for maximum sensitivity and the detector, of course, produces an output signal proportional to the amount of light falling thereon, which signal is suitably enhanced by the amplifier 26 and then is transmitted to subsequent utilization devices. In such systems the polarizer 14 and the analyzer 20 are normally disposed with their axes of polarization at 90° to each other so that no light reaches the detector 24 in the absence of rotation by the magneto-optical device 16. However, when a magnetic field is applied to the device 16 by the coils 18, a rotational effect on the incident polarized light occurs, thus the light striking the analyzer 20 is no longer disposed at angle of 90° thereto and some light will pass through the analyzer 20 depending, of course, on the amount of rotation. Thus, with no current flowing through the coils 18 and no field present, there would theoretically be no light emanating from the system and no signal would be detected by the detector 24 and as current is increased to the coils 18, the rotation of the incident polarized beam by the device 16 will increase since, as indicated previously, the rotation of the plane of polarization is proportional to the field intensity in these materials.

Thus it may be seen that such a rudimentary system as illustrated in FIGURE 1 may be utilized as an on-off switch wherein a signal or current applied to the coil 18 will cause some light to emanate from the system and thus be detected by the detector 24 or with no signal applied will cause a zero or no output signal from the detector.

It should be noted that the analyzer 20, if desired, could be parallel to the polarizer 14 so that with no signal a maximum light will emanate from the system and as a signal is applied, this amount of light will decrease proportionally to the signal applied to the magnetic field inducing means 18. This latter system would effect an inversion of the light signal with respect to the input signal or current to the coils 18. However, such systems are conventionally more sensitive when the polarizer and analyzer are relatively displaced by 45° since the rate of change of intensity of light emanating from the system per degree of rotation is greater at this point rather than the case where the two are parallel or perpendicular.

While the system of FIGURE 1 has been illustrated and described, it is apparent that this is only one possible embodiment of such a light switching or modulating apparatus. For example, the detector 24 and amplifier 26 could be replaced by a viewing screen for optical detection or viewing or conversely, by some other sort of electrical or optical utilization means such as a photoconductor or the like. Similarly, a great many magneto-optically active devices 16 each having a magnetic field inducing means 18 might be suitably arranged in a matrix in front of a single light source 10 and polarizer 14 and if separate signals are applied to the individual magnetic field inducing means 18 a visible matrix display could be produced on a suitable viewing screen. In this latter case, a single analyzer 20 could also be used similarly to the single polarizer 14.

It would also be possible to utilize such a system as a detection means for optical read out of a magnetic memory wherein a magneto-optically active element may be associated with each of the magnetic storage elements such that storage of a particular signal would effect the rotation of polarized light through the magneto-optically active detection member. The present system would be especially suited to this sort of detection since when the magnetic core is switched from a first state to its opposite state, the rotation of the light goes from a plus to a minus value. Thus, the magnitude of the effect is doubled over the situation where no signal is represented by no magnetic flux and a signal is represented by a unidirectional change of flux from the zero condition.

Many other optical devices will, of course, be suggested by the novel magneto-optically active element of the present invention. The significant feature is that the degree of rotation or magnitude of the Verdet constant is of sufficient magnitude to make such devices far more practicable than with previous magneto-optical devices or Kerr cell devices.

Figure 2:
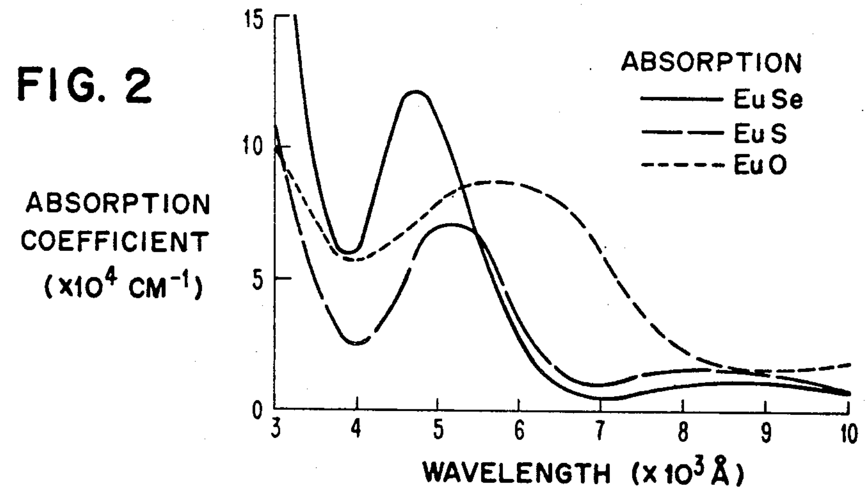
FIGURE 2 is a set of curves showing coefficient of light absorption plotted against wavelength of incident light for the three indicated materials.
Figure 3:
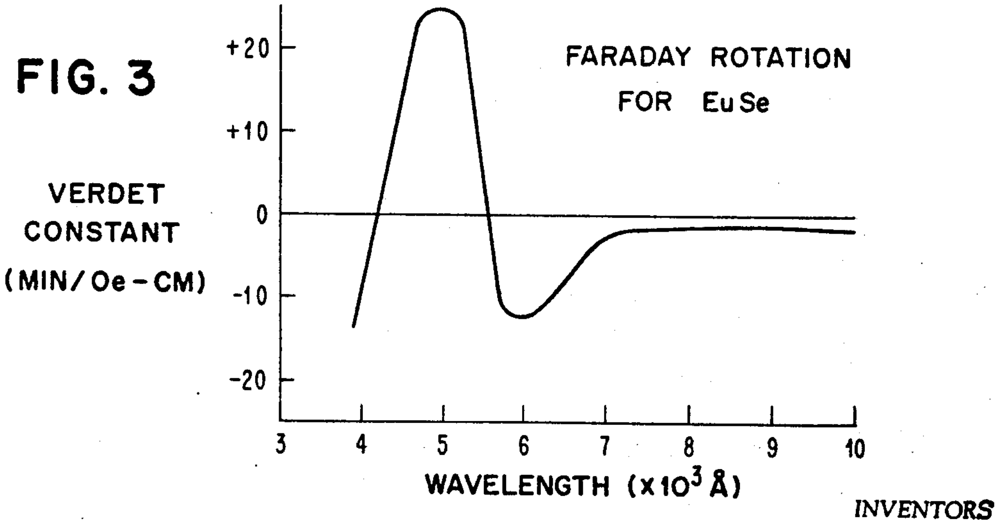
FIGURE 3 is a curve showing Verdet constant plotted against wavelength for EuSe.

Referring now to FIGURES 2 and 3, the results of a number of experiments with magneto-optically active devices made of rare earth chalcogenides will be seen. Referring specifically to FIGURE 2, there appears three curves wherein absorption coefficient is plotted versus wavelength for the three indicated chalcogenides. It will be noted that the three curves are essentially similar in shape although they are shifted with respect to each other as far as certain absorption peaks are concerned. It should further be noted that absorption coefficients above about $2.5\times10^4$ cm.$^{-1}$ render the device very difficult or impractical to use as very little light is transmitted therethrough. Thus, as will be apparent with reference to the description of FIGURE 3, the absorption coefficient of a particular material will somewhat limit the light frequency range for satisfactory device operation.

Referring to FIGURE 3, there will be seen a plot of the Verdet constant plotted against wavelength for EuSe. For the particular curve of FIGURE 3 it will be noted that portions of the Faraday rotation are on the positive side and portions on the negative side depending upon the wavelength of the incident light. Referring to FIGURE 2, it will be noted that virtually all of the positive portion of the curve is in that portion of the frequency spectrum for these materials which is above their usable range, therefore, that portion between about 5500 angstroms and about 7000 angstroms where there is a significant bulge or node in the curve is the most useful range for an optically active device since the absorption coefficient is reasonably low and the Verdet constant is substantially large.

From the above description of the invention, it will be seen that by utilizing magneto-optically active devices composed primarily of the europium chalcogenides that vastly improved Faraday effect devices may be fabricated. If will further be apparent that many variations of the particular simplified device illustrated in FIGURE 1 may be constructed utilizing the basic teachings of the invention and further, various combinations of the europium chalcogenides plus the small indicated percentages of other chalcogenides may be utilized in making the magneto-optically active element without departing from the teachings of the present invention.

It is believed that this new class of magneto-optically active materials when utilized in such Faraday rotation apparatus elevates such apparatus from the category of a laboratory instrument for testing a novel effect to a practical device for the modulation and/or switching of a light beam.

While the invention has been particularly shown and described with reference to preferred embodiments thereof, it will be understood by those skilled in the art that various changes in form and details may be made therein without departing from the spirit and scope of the invention.

What is claimed is:

1. A light modulating system having in combination a source of plane polarized light, a magneto-optical element for rotating the plane of polarization of an incident beam of polarized light impinging thereon, means for selectively applying a magnetic field to said magneto-optical element such that the lines of force thereof are substantially parallel to the direction of traversal of the light through said magneto-optical element, and means for detecting the amount of rotation of said polarized light by said magneto-optical element, the improvement being a magneto-optical element having as its composition a material selected from the group consisting of 1:1 europium chalcogenides and mixtures thereof.

2. A light modulating system as set forth in claim 1 wherein said detection means includes a polarizing filter and photo-sensitive means for detecting the quantity of light which passes through said polarizing filter.

3. A light modulating system as set forth in claim 1 including:

means for maintaining said magneto-optical device at or below its Curie temperature.

4. A light modulating system as set forth in claim 1 wherein said material includes up to about 20% by weight of other rare earth chalcogenides which modify the Curie temperature of the material.

5. A light modulating system as set forth in claim 1 wherein said 1:1 europium chalcogenides include europium sulfide (EuS), europium oxide (EuO), europium selenide (EuSe), and europium telluride (EuTe).

6. A light modulating system of claim 1 wherein the composition of said magneto-optical element is monocrystalline.

7. A light modulating system of claim 1 wherein the composition of said magneto-optical element is polycrystalline.

8. A light modulating system of claim 1 wherein the composition of said magneto-optical element is in the form of a thin film deposited on a substantially transparent optically inactive substrate.

9. A light modulating system as set forth in claim 1 wherein said material is predominantly 1:1 europium sulfide (EuS).

10. A light modulating system as set forth in claim 1 wherein said material is predominantly 1:1 europium oxide ( EuO).

11. A light modulating system as set forth in claim 1 wherein said material is predominantly 1:1 europium selenide (EuSe).

12. A light modulating system as set forth in claim 1 wherein said material is predominantly 1:1 europium telluride (EuTe).

13. A light modulating system as set forth in claim 4 wherein said rare earth chalcogenides are taken from the group of rare earth elements consisting of gadolinium, yttrium, thulium, cerium, lanthanum, terbium, and dysprosium.

14. A light modulating system as set forth in claim 4 wherein said material consists of 99% by weight of europium selenide and 1% by weight of gadolinium selenide.

References Cited

UNITED STATES PATENTS

| | | | |
|---|---|---|---|
| 3,312,141 | 4/1967 | Cary | 350—151 X |
| 3,318,652 | 5/1967 | Berger et al. | 350—151 |
| 3,353,907 | 11/1967 | Shafer | 23—50 |

OTHER REFERENCES

Klemm et al., "Chalkogenide des Zweiwertigens Europiums," Zetchrit für Anorganische and Allgemeine Chemie, vol. 241, pp. 259–263 (1939); in German.

McGuire et al., "Ferromagnetism in Divalent Europium Salts," Applied Physics Letters, vol. 1, pp. 17 and 18 (Sept. 1, 1962).

DAVID SCHONBERG, *Primary Examiner.*

P. R. MILLER, *Assistant Examiner.*

U.S. Cl. X.R.

350—160, 161; 252—62.51